United States Patent [19]

Donato

[11] 4,377,946
[45] Mar. 29, 1983

[54] ELECTRONIC BALANCING SYSTEM FOR BALANCING ROAD VEHICLE WHEELS

[76] Inventor: Giuseppe Donato, Via MacMahon, 77, Milano, Italy

[21] Appl. No.: 162,476

[22] Filed: Jun. 24, 1980

[30] Foreign Application Priority Data

Sep. 5, 1979 [IT] Italy ............................... 25503 A/79

[51] Int. Cl.³ ....................... G01M 1/22; G01M 1/28
[52] U.S. Cl. ........................................ 73/457; 73/462
[58] Field of Search ................. 73/457, 462, 464, 466, 73/467

[56] References Cited

U.S. PATENT DOCUMENTS

| | | | |
|---|---|---|---|
| 3,678,761 | 7/1972 | Blackburn | 73/457 |
| 3,754,447 | 8/1973 | Turton-Smith et al. | 73/457 |
| 3,815,425 | 6/1974 | Skidmore | 73/457 |
| 4,109,532 | 8/1978 | Donato | 73/457 |

*Primary Examiner*—James J. Gill
*Attorney, Agent, or Firm*—Guido Modiano; Albert Josif

[57] ABSTRACT

An electronic balancing system for balancing road vehicle wheels, of the type for balancing mounted wheels, includes a processor driving a light beam projector for projecting directly on the wheel the position where a counterweight is to be attached to eliminate a condition of unbalance the value whereof is indicated on a seven-segment display.

7 Claims, 6 Drawing Figures

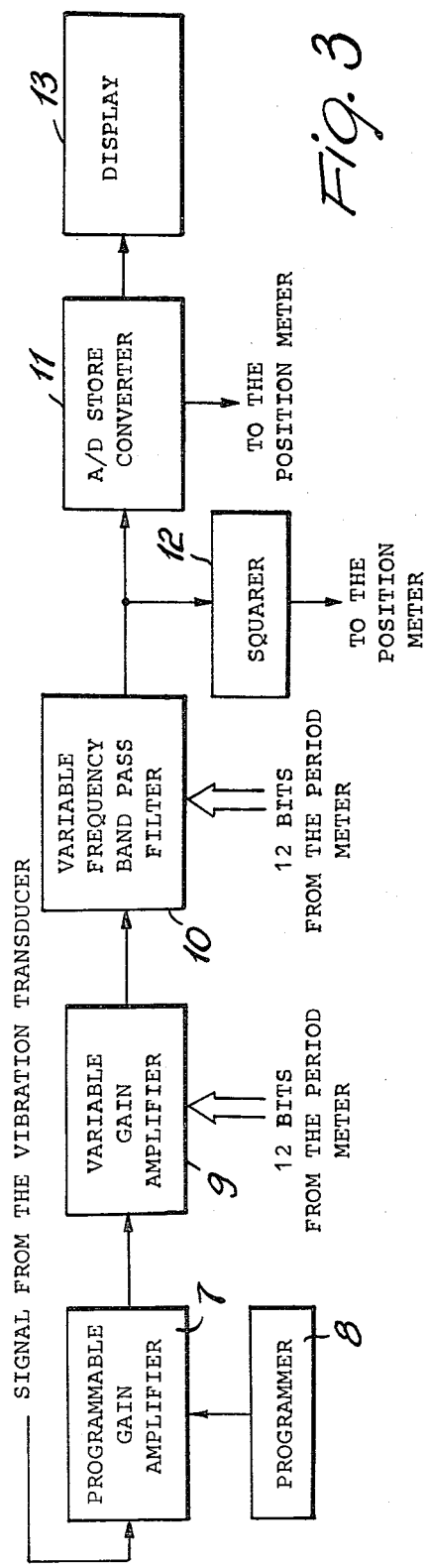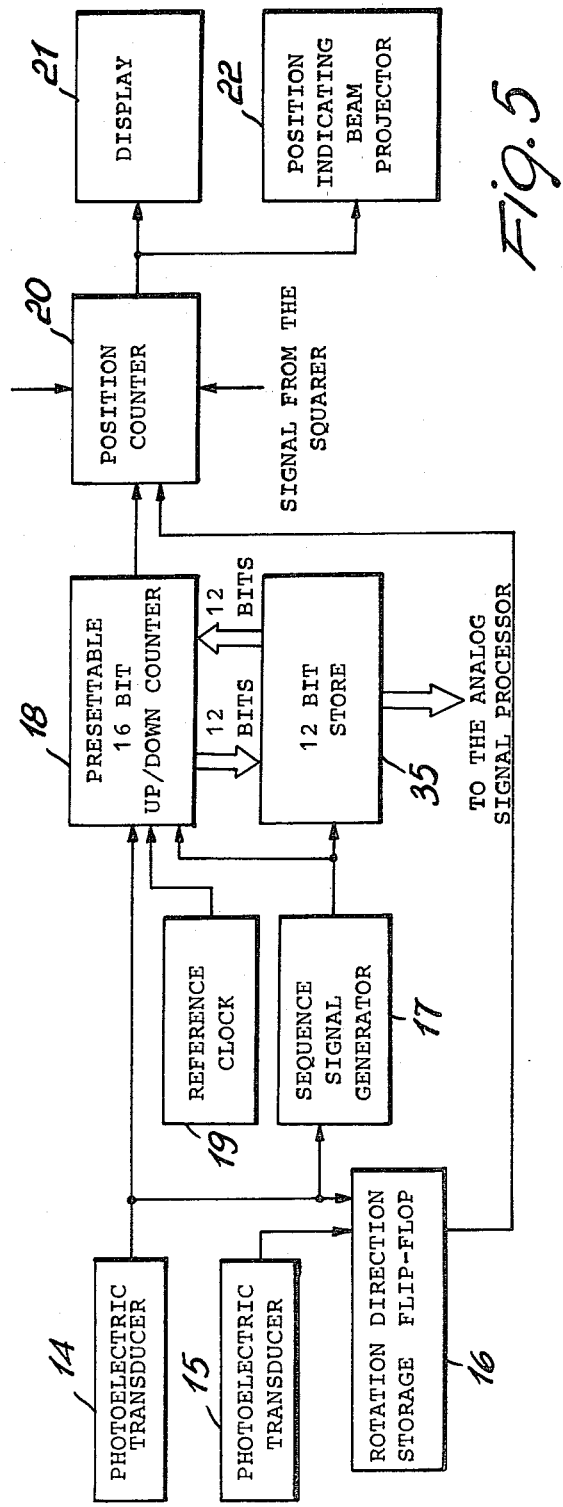

ELECTRONIC BALANCING SYSTEM FOR BALANCING ROAD VEHICLE WHEELS

BACKGROUND OF THE INVENTION

This invention relates to an electronic balancing system for balancing road vehicle wheels, and in particular to a balancing system of the type wherein wheels can be balanced without removing them from the vehicle.

It is a well known fact that, nowadays, wheels are balanced using one of two different types of apparatus, one type allowing wheels to be balanced while removed from the vehicle, and the other affording the possibility of balancing a wheel while mounted to the vehicle in its natural operative emplacement. Since with the latter type, wheels are balanced in their natural emplacement and in conditions approximating the actual operation ones, it is undoubtedly the most accurate. In fact, owing to the wheels being balanced on the former type of apparatus while separated from the vehicle structure, the wheels, upon re-installation on the vehicle, are caused to occupy, owing to the gravity force, a different mounting position with respect to the rotation center from the one they had while connected to the balancing machine, this different position being a source of unbalance. Moreover, those parts which are to rotate rigidly with the wheels are not balanced, and this is an added source of unbalance. Notwithstanding the inaccuracy of the balancing achieved thereby, the apparatus which are suitable for balancing disassembled wheels still enjoy wide acceptance, because the ones intended for balancing wheels in their mounted condition are difficult to operate and require more time.

Thus, the need is felt in this field for a mounted wheel balancing machine which, while retaining highly accurate balancing capabilities, is not only adapted to eliminate the cited sources of difficulties in operation, to make the balancing operation a straightforward one which can be tackled by any unskilled operator, but also reduces the operation time.

The apparatus for balancing wheels while mounted to the vehicle, in spite of their varied configurations, are all inspired by the same principle, and the balancing operation is carried out in the same basic manner: the wheel to be balanced is raised from the ground by means of a jack placed under the vehicle and, at any point on the outer wall of the tire, a reference mark is applied, with chalk or a length of adhesive tape, quite often the inflating valve itself being taken as the reference mark; in this respect, reference can be made to U.S. Pat. No. 3,070,720.

A pulse transducer is placed under the vehicle as close as possible to the wheel to be balanced; some transducers are intended for resting with one end on the ground and the other end against the vehicle, whereas others do not rest on the ground but are attached, by means of a magnet, under the vehicle, still others being incorporated in the jack or lifting device itself. The transducer is connected to the balancer or balancing machine, which generally comprises an unbalance indicator gauge and a stroboscopic lamp, the wheel to be balanced, if not a driving one, being rotated by means of a pulley connected to a motor, and if a driving one, by the vehicle own engine. If the wheel is unbalanced, the pick up device placed under the vehicle wheel, at each revolution, when the unbalancing and hence heavier portion is lowermost, receive an impulse which, when converted into an electric pulse, is transmitted to the stroboscopic lamp or light and to the unbalance indicator gauge; the former will then light up, and owing to the stroboscopic effect, show the wheel as if it were standing still, while the latter will show the extent of the unbalance, which varies according to the wheel r.p.m.; the location of the mark applied to the wheel must be detected at the precise instant when the gauge reads a maximum of unbalance. Once these measurements have been taken, the wheel is stopped, and the mark applied to the wheel is brought back to the position where it had been sighted at the moment of maximum unbalance, and to the topmost portion of the wheel, which corresponds to twelve o'clock, a counterweight is attached, the weight whereof has been indicated on the meter. It will be apparent how, with this balancing system, one has to simultaneously detect two different indications which are apart from each other and moving, because both the meter pointer and the mark on the wheel vary simultaneously with the speed.

This need for simultaneously surveying two points placed apart from each other makes the balancing operation a difficult one. In the instance of driving wheels, to these difficulties, there adds the need for a second operator, who is to stay on the vehicle and rev up and down as required, while the other operator on the ground has to read the extent of the unbalance on the meter and detect the mark on the wheel.

To obviate such drawbacks, as taught for example by German Pat. No. 1,698,111, a photoelectric cell device has been also developed, wherein in addition to the transducer placed under the vehicle, a photoelectric cell transducer is placed in front of the wheel to be balanced and detects the passing of the mark applied to the wheel with chalk or any other suitable marking material. The electric signal correspondingly issued is phase compared, through a suitable electronic circuitry, to the signal from the unbalance transducer. Thus, a voltage is produced which is proportional to the displacement angle and is applied to a motor, to the shaft whereof the slider of a potentiometer and a disk with a pointer are keyed. A negative feedback system, comprising the voltage drawn from the slider of said potentiometer by a differential amplifier, causes the pointer to form, with a reference index, an angle equal to the angle between the signals from the two transducers. Briefly, the apparatus taught by the cited German Pat. No. 1,698,111 provides a slave mechanism wherein a pointer moves similarly to the chalk mark in the traditional stroboscopic devices. The usefulness of such a slave machanism resides in that the two points which the operator is to sight are brought closer to each other, thereby the driving wheel balancing can be performed by one operator. Notwithstanding the advantages mentioned, that apparatus or mechanism is a complex one, and falls short of solving the problem of a quickly and simply carried out balancing operation. In fact, before the correct weight and position are found, the operation must be repeated several times, like with the stroboscopic light apparatus.

Another vehicle wheel balancing apparatus, of the type suitable for balancing wheels in their mounted condition, is disclosed in U.S. Pat. No. 4,109,532 by the same applicant. That apparatus comprises mechanical impulse pick-up means which are adapted, when suitably positioned close to an unbalanced wheel being rotated, for receiving at each revolution thereof a mechanical pulse and converting said mechanical pulse into a corresponding electric pulse of unbalance, unbalance indicating means circuit connected to said pick-up means to receive therefrom, at each revolution of said wheel, said electric pulse of unbalance, said indicator means being adapted for storing the electric pulse from said pick-up means which corresponds to the maximum amount of unbalance of said wheel, unbalance position detecting means circuitally connected to said pick-up means to receive therefrom, through control circuit means, electric pulses of unbalance which correspond to said mechanical pulses, and adapted to be energized by said electric pulses and to cooperate with said unbalance indicating means for detecting the position of said unbalance in said wheel, and including a position of unbalance indicating disk which is adapted to be removably associated with said wheel to cooperate with said unbalance position detecting means and with the unbalance indicating means to provide the position of said unbalance in said wheel, and display means operative to display the exact position of said unbalance in said wheel as indicated by the position of unbalance indicating disk.

With the apparatus of U.S. Pat. No. 4,109,532, the balancer proper is placed in front of the disk, after the latter has been attached to the wheel. The balancer, in addition to the unbalance and position indicating gauges, further comprises two photocells, which are directed against the disk. As the wheel rotates, the first photocell is energized by the passage of the zero-indicating mark. Simultaneously therewith, the second photocell starts counting the series of spaced marks to store in the digital meter the number corresponding to the mark whereat maximum unbalance occurs. After stopping the wheel, at the stored number position, a counterweight is applied the weight whereof is read on the second gauge.

While that apparatus has proved satisfactory, it still shows some complication in use, such as the need for positioning the cited disk onto the wheel to be balanced. In fact, the disk could not be a single or standard one, but had to be changed in conformity with the type of rim of the wheel to be balanced, thereby the apparatus had to be equipped with a plurality of such disks, which must be selected each time by the operator performing the balancing.

SUMMARY OF THE INVENTION

In view of the aforementioned drawbacks of conventional wheel balancing apparatus this invention sets out to provide a vehicle wheel balancing system, of the type suitable for balancing mounted wheels, which can achieve full balancing of the wheel without requiring the positioning of any element on the wheel itself.

Within that general aim, it is an object of this invention to provide a balancing system of the electronically operated type, which can accomplish, through a simple circuitry, a reliable discrimination between the unbalance signal, as generated by the unbalancing weight of the wheel, and spurious signals originated by other mechanical components set into rotation together with the wheel itself (i.e. bearings, disks, drive members, etc.).

It is a further object of the invention to provide a balancing system, whereby the position of unbalance can be directly and immediately found on the wheel to be balanced.

Another object of this invention is to provide a balancing system, whereby a wheel can be balanced regardless of the direction of rotation of the same.

Still another object of the invention is to provide a balancing system, whereby the effective amount of the unbalancing weight can be at all times ascertained in a reliable manner, regardless of the wheel diameter and width or thickness.

A not unimportant object of this invention is to provide a balancing system which is compatible with the system according to the aforementioned U.S. Pat. No. 4,109,532 and which, in particular and if desired, can make use of the disk element taught in said patent.

The general aim and objects mentioned above are all achieved by an electronic balancing system for balancing road vehicle wheels, of the type suitable for balancing mounted wheels, according to this invention, including electromechanical transducer means operative to supply electric signals which are proportional to the vibration induced by the unbalance of a wheel to be balanced, optoelectronic transducer means operative to supply electric signals when energized by marks on said wheel, characterized in that it further comprises light beam projector means and analog and digital processing means adapted to receive the signals from said electromechanical transducer means and from said optoelectronic transducer means and to process said signals such as to cause said projector means to project onto said wheel a beam of light indicating the position whereat a counterweight must be attached to correct the unbalance of said wheel.

Advantageously, moreover, said analog/digital processing means afford the possibility of balancing any type of wheels, regardless of the diameter and width or thickness thereof. In particular, said means will process the data from the transducers and immediately provide the necessary information for the exact balancing of the most commonly used types of wheels and correction data for an exact balancing of any other types of wheels. By virtue of the technical solution proposed by this invention, and particularly of the presence in said processing means of an active band-pass filter, a reliable discrimination can be carried out between the spurious signals due to the mechanical elements set in motion together with the wheel and the actual unbalance signal: this was not feasible instead with conventional apparatus where, to eliminate spurious signals, low-pass filters were employed which could not ensure full elimination of said spurious signals.

Furthermore, by providing a visual projector, in the system according to the invention, it becomes possible to relocate the position of unbalance directly on the wheel itself, in an immediate fashion, that is without manipulating the wheel, specifically without placing any separate element thereon, by means of a light trace; onto the wheel itself, moreover, a light or luminous cross is projected which will serve as a reference mark for centering the balancer with respect to the wheel hub. With the top end of that cross, the operator will align a mark previously applied to the wheel with chalk or crayon: at this point, the other light trace or marking shows the position whereat the counterweight must be attached to remove the unbalance, the counterweight value being stored in a second meter. Thus, that position being clearly visible on the wheel, there is virtually no possibility for errors in locating the counterweight position.

By applying preliminarily to the wheel two chalk marks or the like, it becomes possible to make the inventive system, in association with two optoelectronic transducers, independent from the direction in which the wheel is being rotated, i.e. clockwise for the right one, and counterclockwise for the left one, and this without resorting to a switch under control by the operator, thus avoiding any chance of error as resulting from such control.

BRIEF DESCRIPTION OF THE DRAWINGS

Further features and advantages of the balancing system according to this invention will become more clearly apparent from the following detailed description of embodiments thereof, illustrated by way of example and not of limitation in the accompanying drawings, where:

FIGS. 3 and 4 are partial representations in the form of block diagrams of the analog processor associated with the balancing system according to the invention;

FIG. 5 is a block diagram illustrating a first embodiment of a digital processor utilized in the balancing system of this invention.

DESCRIPTION OF THE PREFERRED EMBODIMENTS

Figure 1:
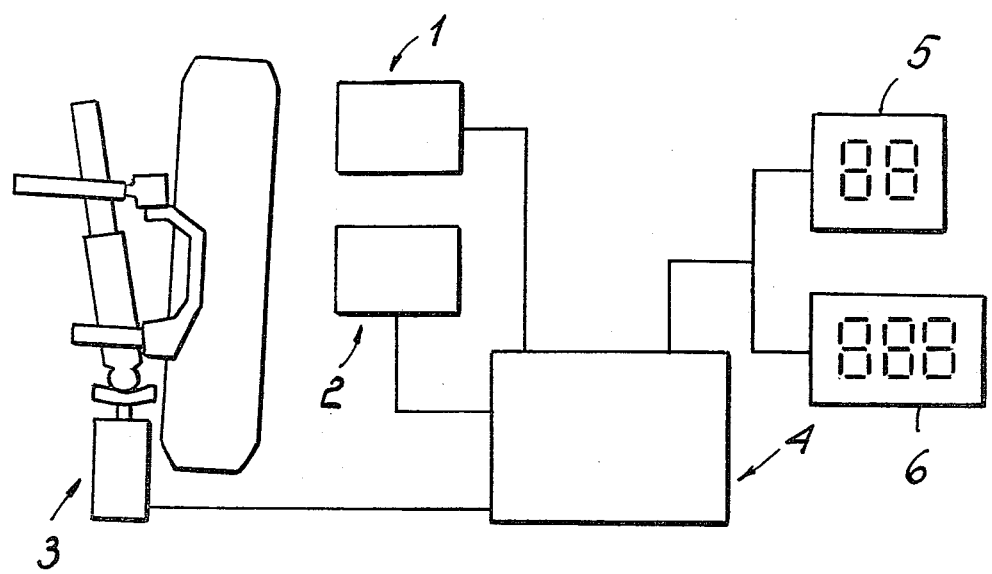
FIG. 1 shows is a general diagram of the balancing system according to the invention.
Figure 2:
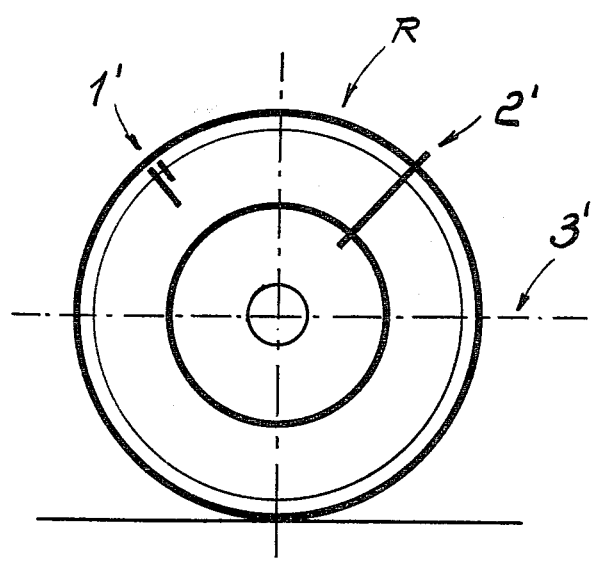
FIG. 2 illustrates how the face of the wheel to be balanced is presented to the balancing system of this invention.

With reference to the cited drawing figures, and in particular to FIGS. 1 and 2, there are shown respectively a general diagram or layout of the balancing system according to this invention, and a wheel R to be balanced. The system comprises an optoelectronic, or photoelectric, transducer block 1, wherein two such transducers are provided, e.g. two photoelectric cells (not shown). These optoelectronic or photoelectric transducers are enabled to supply, upon rotation of the wheel R, electric signals as two marks of different length 1' move past them which have been previously applied, e.g. with chalk, to the wheel itself; the system according to the invention further includes a block 2 comprising light beam projecting means effective to project onto the wheel a luminous cross 3' which will serve as a reference for centering the balancer with respect to the wheel hub, and to also project a luminous mark 2' indicative of the position of the counterweight to be installed in order to correct the wheel unbalance. The system also includes a vibration transducer 3, of conventional design and readily available on the market, which is effective to convert the mechanical vibrations produced by the wheel unbalance into electric pulses proportional thereto. The group of photoelectric transducers 1, group of projectors 2, and vibration transducer 3 are circuitally connected to an analog and digital processing unit 4, which will be described in detail hereinafter. Connected to the output from the analog/digital processing unit 4 are a display 5 adapted for indicating the position of the unbalancing weight, and an additional display 6 adapted for indicating the value or amount of said unbalancing weight.

It should be considered, however, that the display 5 is not a strictly necessary component of the inventive system, since the latter is enabled, as explained hereinafter and shown in FIG. 2, to indicate directly on the wheel the position of the unbalancing weight by means of a luminous trace. Said display 5 may rather be optionally employed, e.g. on account of a long standing and tested practice, as applicational requirements may dictate, where instead of the two marks 1' to be applied with chalk to the wheel, it is desired to use the disk of the cited U.S. Pat. No. 4,109,532 by the same applicant.

Figure 4:
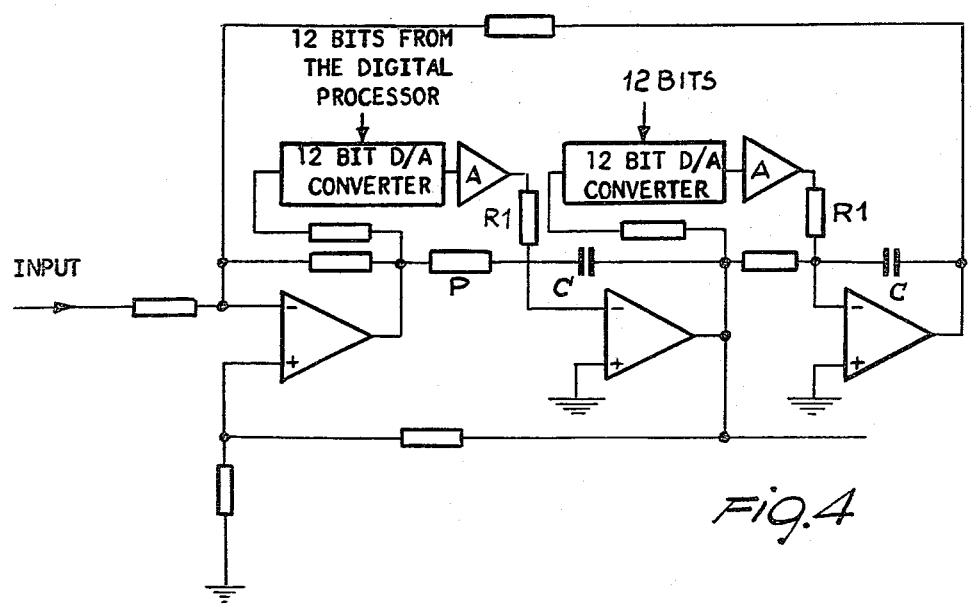

With reference now to FIGS. 3 and 4, the analog processor of the analog/digital processing unit 4 of FIG. 1 will be described. That analog processor includes a programmable gain amplifier 7 the gain whereof can be programmed through a programmer 8. The amplifier 7 comprises a digital/analog converter whereto, instead of the reference voltage, there is applied the signal from the vibration transducer 3: in this manner, a current is obtained which is proportional to the 8-bit digit set by means of the programmer 8. In cascade connection with the programmable gain amplifier is a variable gain amplifier 9, which comprises a digital/analog converter whereto, in lieu of the reference voltage, the signal from the amplifier 7 is applied. Thus, a current is obtained which is proportional to said voltage and at the same time also related to the digit, e.g. a 12-bit digit, appearing at the converter inputs. This 12-bit digit will be proportional to the rotation period or the square thereof, through a ROM or read-only store, thereby a gain is obtained which is automatically variable as a function of the rotational speed of the wheel, such that the characteristics of the vibration detectors can be compensated. It should be noted that the programmable gain amplifier 7 and the variable gain amplifier 9 are commercially available as a single integrated unit, for example by the firm NATIONAL SEMICONDUCTOR, of U.S. nationality, residing in Santa Clara, Calif., under their catalogue designation DAC 2022.

In accordance with the invention, in cascade connection with the amplifier 9, there is provided a variable frequency band-pass filter 10, which, for example, is commercially available from said NATIONAL, under their catalogue designation AF 100, the filter 10 (refer also to FIG. 4) comprises a series of amplifiers and RC groups. The resonance frequency of said filter will be determined by the value of the RxC product. Thus, it becomes possible to vary the value of said resonance frequency, e.g. by varying R. This is in fact what is achieved through the resistor R1 (FIG. 4), which being controlled by the output voltage of the 12-bit converter and following amplifier, presents itself as a variable resistor supplies a variable current, depending on the applied voltage. In this way the same result is achieved as if the resistance of the resistor R1 were varied, so that the resonance frequency of the filter is synchronized with the rotation speed of the wheel. As mentioned already, the band-pass filter constitutes a peculiar feature of this invention, in that it affords the possibility of discriminating, from the signals supplied by the mechanical transducer, only the actual signal which correspond to the unbalance. In fact, the signal from the unbalance mechanical transducer is generally composed of a plurality of signals which are not perfectly sinusoidal, as in the case of the signals generated by a balancer for disassembled wheels, where the entire system is mechanically perfect and free of play and spurious vibratory sources. In the case of a balancer for mounted wheels, in addition to the signal produced by the unbalancing weight of the wheel, as mentioned, there occur other spurious signals, generally non-isofrequential with the former, which are due to the other mechanical components set to motion along with the wheel, such as bearings, disks, drive members, etc.

Furthermore, in a mounted wheel balancer, the working speeds are usually variable; in other words, since the assembly comprising the wheel and shock absorber is generally comparable to an RLC system, it is necessary to store the position of the unbalancing weight at the resonance frequency or multiple thereof, these being the only speeds at which that position is the actual one. Now, the central frequency of the band-pass filter is indeed synchronized with the wheel rotation speed, differently from conventional systems wherein, to eliminate the spurious signals, low-pass filters are used which are not, however, adequate to ensure complete elimination of the noise.

In cascade connection with the band-pass filter 10, there is provided an A/D store converter 11: this is an analog/digital converter with a digital store and related digital comparator, (of conventional type, for example available under the catalogue designation AD 8008 from the NATIONAL) which indicates the peak value of the voltage produced by the vibration transducer and supplies the signal for the position meter. The output of the band-pass filter 10 is also connected to a squarer circuit 12 (a conventional comparator, for example available under the catalogue designation L 311 from NATIONAL), which has the function of converting the signal from the vibration transducer, as suitably filtered, into a square wave with the same phase, to be passed to the unbalance position meter, as will be explained hereinafter. Also to the unbalance position meter is passed the output from the A/D store converter 11. Finally, in cascade relationship with the converter 11, a three-digit seven-segment digital display 13 is provided, e.g. of the LED, liquid crystal, electrofluorescent, or the like types, which indicates the value of the unbalancing weight. As mentioned in the foregoing, this is the only value required in the inventive system, because the position whereat the counterweight should be attached will be projected optically onto the wheel itself, directly by the projector block 2 (FIG. 1).

With reference now to FIG. 5, a first embodiment will be described of the digital processor included in the block 4 for processing the signals from the transducers. As shown in FIG. 5, the photoelectric transducers 14 and 15 may comprise, for example, phototransistors, photodiodes, photoelectric cells, or the like components, which through suitable optical provisions, are adapted to discriminate the passage of white and black sections across a limited area. The output signals from the photoelectric transducers 14 and 15 are passed to a rotation direction storage flip-flop block 16 for detecting and storing the direction of rotation of the wheel: this circuit, being driven by the two photoelectric transducers 14 and 15, serves the function of detecting and storing the direction in which the wheel is rotated and supply a related signal to the position counter. A peculiar feature of this invention is that the balancing system is unrelated to the direction selected for the rotation of the wheel, this being accomplished without resorting to the use of switches, which could introduce detection errors. The output signal from the photoelectric transducer 14 is also passed to the input of a sequence signal generator block 17. This device, being controlled by the photoelectric transducer 14, serves to generate a pulse sequence which control the operation of the presettable up/down counter 18, as explained hereinafter. The counter 18 is a 16-bit counter, of the presettable type, which in the inventive system performs several functions, under control by the clock generator 19 and sequence signal generator 17. During the first revolution of the wheel R, it behaves like an ordinary period meter, driven by the signal from the photoelectric transducer 14, which detects the passing of the wheel reference mark. At the beginning of the following revolution, the sequence signal generator 17 will supply a sequence of pulses to actuate the following operations: storing of the content of counter 18 in the 12-bit store 35; switching of the counter 18 from an up count over to a down count; multiplying by N (e.g. by 60) the frequency of the reference clock 19; in these conditions, the counter 18 starts counting down from the stored digit, and each time that its content reaches the 0 value, a pulse is emitted to the position counter 20, which also receives the signal from the squarer 12, and the counter is re-loaded with the digit present in the store 35.

It will be appreciated from the foregoing that at the end of the second revolution the position counter 20 contains the digit N, e.g. 60. At the beginning of the next revolution, the initial conditions will be restored. The 12-bit store 35 is driven by the generator 17 of the sequence signals and stores the digit corresponding to the wheel rotation period. This store, as shown, interacts with the 16-bit counter 18. The position counter 20 receives the count pulses from the 16-bit counter 18, as described hereinabove, and these pulses are, as mentioned, N for each even revolution of the wheel. This counter 20 has, moreover, a store device which is controlled, as indicated, by the signal from the squarer 12 and the signal from the A/D converter 11. This signal enables the storing of the counter content at the transition time corresponding to the positive edge of the squarer signal when a maximum occurs in the unbalance signal. In cascade connection with the position counter 20, there is the display block 21 which may be, for example, a two-digit display, of the light emitting diode, liquid crystal, or the like type, through which the position of the counterweight that will balance the wheel R is indicated when, as mentioned, use is made of the disk according to the cited U.S. patent by the same Applicant. The output signal from the position counter 20 is also supplied to the position indicating beam projector group 22: this device comprises a glass support over which an annulus is formed which is divided in 60 sectors which, through suitable electric voltages, as obtained by decoding the signal from the position counter 20, are all opaque excepting one. This device will be placed in front of an optical projection system which sends then a light ray through the position of the clear sector corresponding to the position where the counterweight must be located, namely to the light ray 2' shown in FIG. 2. Instead of this device, which may be produced for example by the liquid crystal technique, other devices may be utilized, of course, which can perform the same function, using different technologies. Again to achieve the aforesaid results, a stepped motor could be used with a sector-less disk, and other similar devices. Thus, for example, one of such devices could be the projection of a series of numbers onto the wheel to be balanced by means of a slide or diapositive placed in the apparatus. In this case, the zero of that series of numbers would be aligned with the longer mark applied to the wheel to be balanced. To find the position where the counterweight is to be attached, use is made of the digital numeric counter indicating the number whereat said counterweight should be placed, similarly to when the disk was attached to the wheel. The advantage of this system resides in that it is unnecessary to use the disk, whereas a disadvantage is when the projected numbers must be read in lighted spaces, in which condition the previous solution with the disk may be preferable.

The possibility of indicating directly onto the wheel, by means of a light ray, the position where the counterweight must be placed to correct the unbalance, constitute another peculiar feature of this system, which is quite novel in the field of balancing apparata.

The reference clock 19 may comprise a quartz oscillator generating a signal which constitutes the system time reference.

Figure 6:
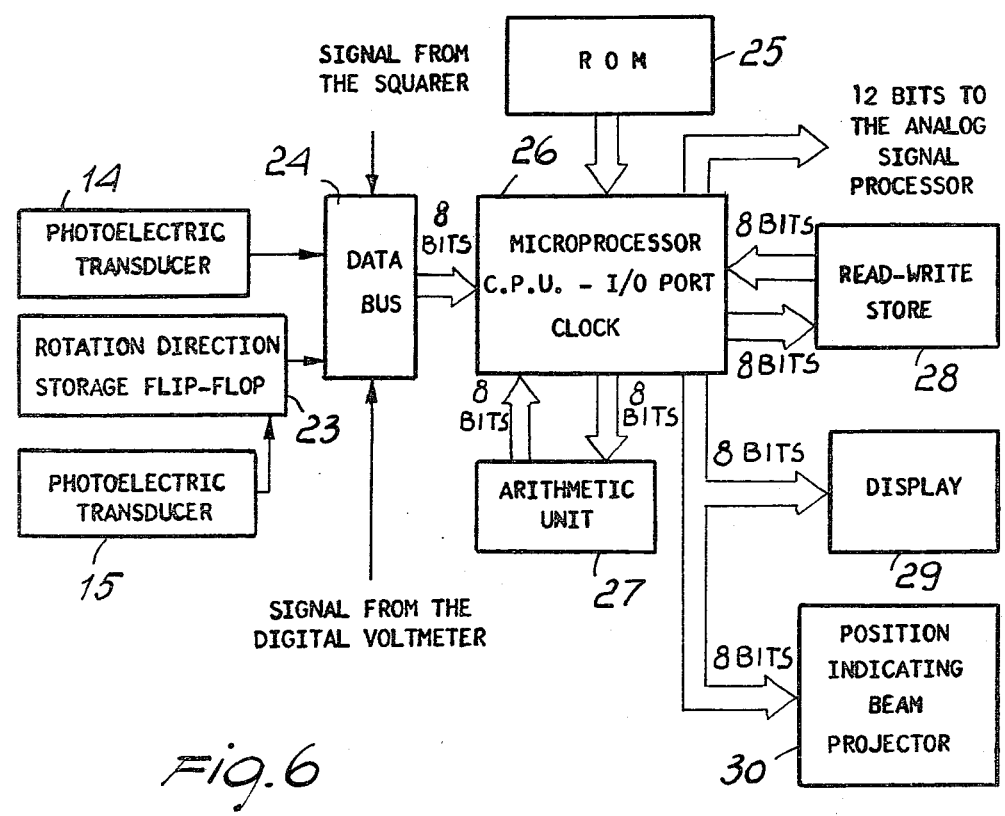
FIG. 6 is again a block diagram illustrating a further embodiment of a digital processor utilized in the inventive balancing system.

With reference to FIG. 6, another embodiment of the digital processor included in the processing block 4 of FIG. 1 will be next described. This processor includes a rotation direction storage flip-flop 23, similar to the flip-flop 16 in the preceding embodiment. It further comprises a data bus 24 enabled to organize in an eight-bit byte the signals from the transducers and other elements of the apparatus, which will be processed by the microprocessor (for example the well known 8080 of the INTEL CORPORATION, of U.S. nationality, residing in Santa Clara, Calif.). To the block 24 is also passed the signal from the squarer 12 and from the digital voltmeter. The read-only (ROM) storage 25 contains the system operation program which controls the transfer of data between the data bus 24, CPU 26, arithmetic unit 27, read/write store 28, display 29, projector 30 of the position indicating beam or ray. The read/write store 28 contains the data of the partial processing by the microprocessor; the arithmetic unit 27 comprises a unit which is enabled to carry out arithmetical operations on the data which appear at its input; the microprocessor 26 comprises the CPU, a reference clock, input/output elements I/O, and effects under control by the program contained in the read-only storage 25 the transfer of data from the inputs to the outputs, store, arithmetic unit, the processing and storing thereof.

The microprocessor 26, in association with the aritmetic unit 27, replaces the sequence signal generator 17, 16-bit counter 18, and 12-bit store 35 of the preceding embodiment. The microprocessor 26 begins counting, at constant time intervals, until a signal from the squarer, by modifying the content of the data bus 24 effects the transfer of the CPU storage content into the read/write store allowing the counting to continue until the reference mark moves once again past the photoelectric transducer. At this instant of time, the storage or accumulator content is once again transferred into the read/write store. Thus, there will be present in the read/write store two digits. If, during the rotation period, the digital voltmeter reaches the signal indicative of a maximum of unbalance, then these two data will be retained, whereas they are otherwise cancelled and replaced with the next ones. After the wheel has been stopped, these data are processed by the arithmetic unit 27 to obtain the signal for the display 21 and the position indicating beam projector. This operation is a simple matter of dividing through the two digits and multiplying the result by N, e.g. by 60, to only retain the integer portion of the result. The position indicating beam projector may be similar to the previously described projector 22.

It will be noted from the foregoing that the invention fully achieves its objects. In particular, a balancing system has been provided, of the type for balancing mounted wheels, wherein any balancing errors due to the intervention of an operator are minimized. In particular, the operator is enabled to observe directly on the wheel, through a light ray, the position where the counterweight is to be attached to remove the unbalance. This system, thanks to the use of the analog and digital processing devices described hereinabove, constitutes indeed a useful electronic apparatus, well ahead in the road vehicle wheel balancing field. The inventive system, contrary to conventional systems, allows, as shown, the balancing of any wheels, irrespective of their diameter and width or thickness. In particular, an actually manufactured embodiment of the instant system has been pre-calibrated to permit immediate balancing of the most common type of wheel: this balancing is obtained by placing a weight on the wheel the amount whereof is indicated by the unbalance measuring display, and the position whereof is indicated by the position indicating light ray or beam. After this initial stage, a second test is carrid out, one of two results being possible, i.e a perfectly balanced wheel, or a wheel having residual unbalance. In the latter case, the inventive system will supply the information required to adjust the position and weight until a perfect balance is achieved. As already mentioned, the system has been calibrated according to the most commonly used type of wheel; in balancing this wheel, the weight will be exact. For wheels of different types, there will be placed onto the wheel the weight indicated by the display showing the value of the weight for a first test of the wheel, and based upon this reference weight, the processing unit associated with the system will provide, with a further test, the exact weight. Thus, exact balancing is achieved in all conditions and for any types of wheels.

While the invention has been described with reference to specific embodiments thereof, it should be considered that the embodiments herein described and illustrated are only given by way of example and not of limitation to the scope of the invention such as is defined in the appended claims.

I claim:

1. Electronic balancing system for balancing mounted road vehicle wheels, comprising:
   a wheel to be balanced having marks on it;
   electromechanical transducer means to supply electric signals proportional to the vibration induced by the unbalance of the wheel;
   a pair of optoelectronic transducer means to supply electric signals when energized by said marks;
   analog and digital processing means including programmer means; a programmable gain amplifier electrically connected to said electromechanical transducer means and programmer means for supplying a current proportional to the number set in the programmer means; a variable gain amplifier connected to said programmable gain amplifier and said period meter means; active band-pass filter means connected to said variable gain amplifier and said period means synchronized with the rotation speed of the wheel; analog to digital converter means including storage means and comparator means connected to said filter means to indicate the peak value of the electrical signal produced by said electromechanical transducer means; squarer means connected to said band-pass filter means to convert said electrical signal into an indentical phase square wave; and display means connected to said analog to digital converter means to indicate the value of the unbalancing weight;

a digital processor including period meter means connected to said squarer means and to said optoelectronic transducer means to locate the position of said unbalance;

light beam projector means connected to said digital processor to project onto the wheel a beam of light indicating the position of unbalance.

2. Electronic balancing system according to claim 1, wherein said digital processor comprises:

flip-flop means connected to said optoelectronic transducer means for detecting and storing the direction of rotation of the wheel;

a microprocessor unit including reference clock means;

a data bus connected to said flip-flop means, said transducers and said microprocessor unit;

a read-only store operatively connected to said microprocessor unit controlling the transfer of data thereto;

a read-write store interfacing with said microprocessor unit, receiving partial processing data therefrom;

an arithmetic unit interfacing with said microprocessor unit.

3. Electronic balancing system according to claim 1, wherein said digital processor comprises:

flip-flop means connected to said optoelectronic transducer means for detecting and storing the direction of rotation of the wheel;

sequence signal generating means connected to one of said pair of optoelectronic transducer means;

a sixteen-bit presettable up-down counter means operatively connected to said sequence signal generating means, functioning as period meter and counting down from a stored digit or number;

a store connected with said counter means and said sequence signal generating means for storing the rotation period of the wheel;

position counter means connected to said sixteen-bit counter means and including storage means connected to said squarer means and said flip-flop means.

4. Electronic balancing system according to claim 1, wherein said projector means project on the wheel a luminous cross useful as reference in centering said balancing system with respect to the hub of said wheel.

5. Electronic balancing system according to claim 1, wherein said projector means include a glass support comprising a plurality of opaque sectors and one clear sector, and an optical projection system.

6. Electronic balancing system according to claim 1, wherein said projector means include a stepped motor and a disk allowing a light beam therethrough in a predeterminate position thereof.

7. Electronic balancing system according to claim 1, further comprising display means for visually indicating the position of a counterweight to be attached to the wheel, wherein a series of numbers is projected onto the wheel.

* * * * *